PHASE CODED COMMUNICATION SYSTEM

Filed Nov. 27, 1957

INVENTOR
SOLOMON ZADOFF
BY
ATTORNEY

United States Patent Office 3,099,796

Patented July 30, 1963

3,099,796
PHASE CODED COMMUNICATION SYSTEM

Solomon Zadoff, Flushing, N.Y., assignor to Sperry Rand Corporation, Great Neck, N.Y., a corporation of Delaware Filed Nov. 27, 1957, Ser. No. 699,396
13 Claims. (Cl. 325—30)

Figure 1:
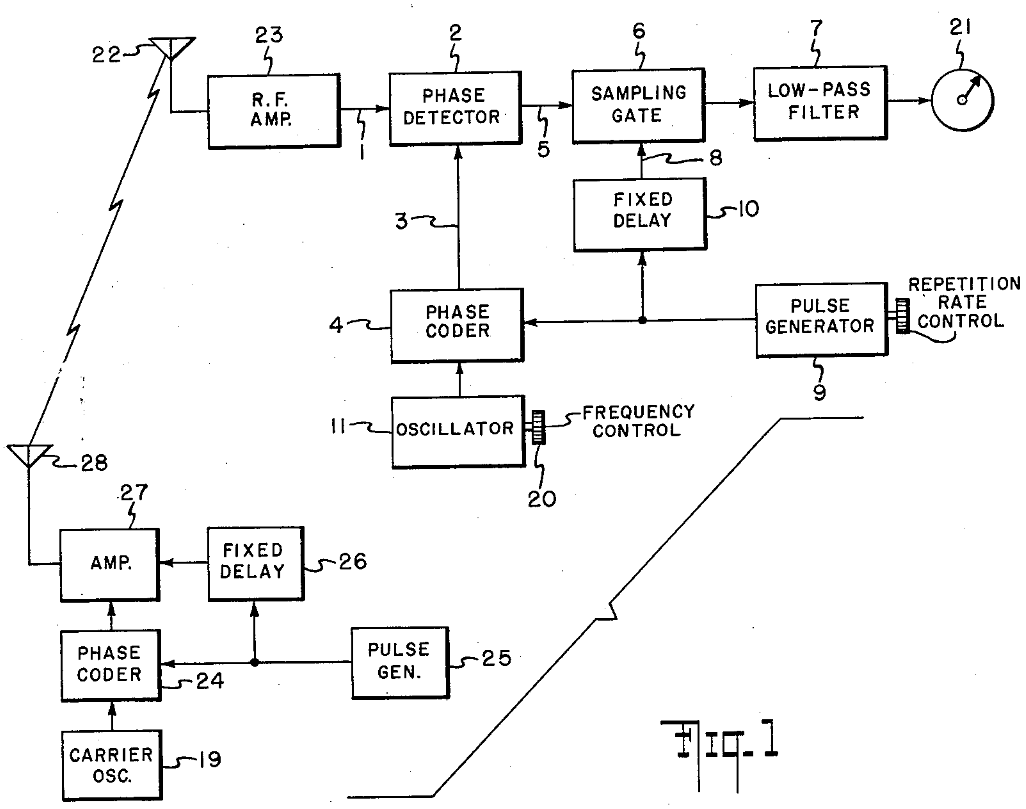

The invention relates generally to radio communication systems and, more particularly, to such systems adapted to communicate information from a transmitter to a receiver by the technique of phase modulating the transmitter carrier in accordance with a predetermined phase pattern. The receiver portion of the communication system of the present invention is suitably arranged in accordance with a prior knowledge of the nature of the transmitted phase modulation pattern, to discriminate in favor of said transmission as against all other signal transmissions that may be present at the receiver input.

In patent application U.S. Serial No. 588,570, filed on May 31, 1956, in the names of Robert L. Frank and Solomon Zadoff and assigned to the present assignee, radio transmitter and radio receiver apparatus are disclosed which operate, respectively, to transmit a predetermined phase coded signal and to receive said signal to the substantial exclusion of all other signals not phase coded in such predetermined manner. Phase coding is defined as involving the shifting by a respective and predetermined amount the phase of the carrier of each successive transmission, which transmission may also be pulse modulated. Thus, in an illustrative case the transmitted carrier may be both amplitude modulated in the form of pulses and phase modulated by the aforementioned shift of the carrier phase.

The receiver apparatus disclosed in the foregoing patent application employs a phase detector having first and second inputs to which are applied, respectively, a received phase coded pulsed signal and a reference signal. The reference signal, locally generated at the receiver, is stepped in phase by amounts identical to the steps in phase of the transmitted carrier. Means are provided in the receiver for controlling the frequency of the reference signal input to the phase detector as well as the stepping of the phase of said reference signal so that the received phase coded signal may be tracked both in phase and in time by the reference signal.

An illustrative code is shown in the aforementioned application for determining the sequence and amounts of phase shift of the successive transmitted pulses. For purposes of exemplifying the operation of the system using the illustrated phase code, it was indicated that the receiver phase detection apparatus produces a maximum D.C. output only when the phase coding of the received signal, as applied to a first input of the receiver phase detector, precisely duplicated the phase coding of the reference signal simultaneously applied to a second input thereto. Lesser amounts of D.C. output are produced under other phase conditions. In other words, the mere fact that a substantial D.C. output was produced did not unambiguously indicate that the received coded signal and reference coded signal were in complete alignment.

One solution to the problem of eliminating ambiguous D.C. outputs from the receiver phase detector is given in patent application U.S. Serial No. 650,534, filed on April 3, 1957, in the name of Robert L. Frank, and assigned to the present assignee. In that application, a particular generic category of phase coding sequences is taught, the use of which in both the transmitting and receiving apparatus of the phase coded communication system produces a substantial D.C. output from the receiver phase detector in the sole event that the received coded signal and locally generated coded signal are in precise phase agreement at the receiver phase detector. Briefly stated, patent application U.S. Serial No. 650,534 discloses a phase coding sequence, definable in terms of a square matrix wherein the phase coding sequence is periodic over $n$ pulses, $n$ being a perfect square, i.e., $n$ may have the value of any integer itself having an integral square root.

The present invention is an extension of the phase coding technique disclosed in patent application U.S. Serial No. 650,534, which eliminates the restriction that the phase coding sequence be periodic over a number of pulses, which number is a perfect square.

One object of the present invention is to provide a phase coded radio communication system wherein the transmitter carrier is phase coded by discrete phase shifts of the transmitter carrier, the phase coding sequence of the transmitter carrier being periodic over a number of pulses, which number is any integer having an irrational square root.

Another object is to generate phase coded pulsed signals having uniform time spacing between pulses and wherein the phase coding sequence is periodic over $n$ pulses, $n$ being an integer greater than zero whose square root is irrational.

A further object is to provide a receiver for use in a radio communication system employing a phase coded pulsed transmitted signal, the pulses of the signal being uniformly spaced in time and the phase coding sequence of the signal being periodic over an integral number of pulses, the number being greater than zero and having an irrational square root wherein the received phase coded signal is cross correlated with an identical locally generated phase coded signal to produce a unique output only when the two signals are precisely matched in phase.

These and other objects of the present invention, as will appear more fully from the following specification, are accomplished in an illustrative case by the provision of a transmitter emitting phase coded and pulse modulated signals, and a receiver detection system including a phase detector having first and second inputs. The received signals are applied to a first input of the phase detector and locally generated phase coded signals are applied to the second input thereof. In a preferred embodiment, the output of the phase detector is applied to the signal input of a sampling gate, the control input of which is derived from a local source of pulses, which pulses are adjustable to be uniformly separated in time by the same amount separating the transmitted pulses. By proper timing of the locally generated pulses, the sampling gate is rendered conductive synchronously with the occurrence of the received pulses.

The output of the sampling gate is applied to a low-pass filter of conventional design which passes the D.C. component of the output from the sampling gate and substantially rejects all other frequency outputs. By employing phase coding apparatus in both the transmitter and receiver in accordance with the present invention, whereby the phase coding sequence of the phase coded signals is periodic over an integral number of pulses greater than zero, which number has an irrational square root, an output from a low-pass filter is produced only in the event that the phase coded received signals as applied to the signal input of the phase detector precisely correspond in time and phase with the locally generated phase coded signal applied to the reference input of the phase detector.

Figure 2:
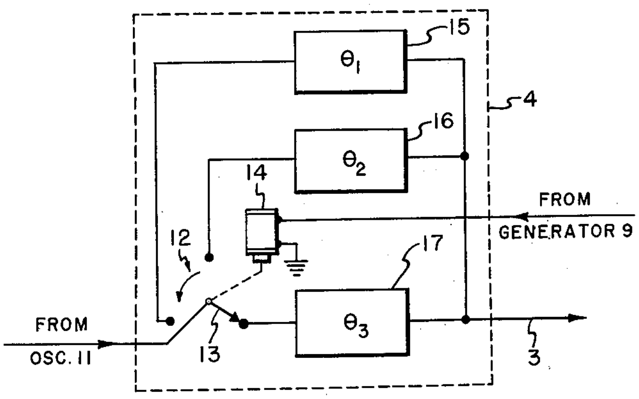

For a more complete understanding of the present invention, reference should be had to the following specification and to the appended drawings of which:

FIG. 1 is a block diagram of a simplified communication system embodying phase coding apparatus of the present invention in both the transmitter and receiver, and FIG. 2 is a schematic diagram of an illustrative phase coding apparatus for use in both the transmitter and receiver of the system of FIG. 1.

In FIG. 1, the output of carrier oscillator 19 is coupled to the signal input of phase coder 24. The control input to coder 24 is derived from the output of pulse generator 25 which is also coupled via fixed delay 26 to the modulating input of amplitude modulating amplifier 27. The phase coded and amplitude modulated output signal from amplifier 27 is radiated by antenna 28.

The transmitted signal is received and amplified by antenna 22 and R-F amplifier 23, respectively, and is then applied by conductor 1 to a first input of phase detector 2. The second or reference input to phase detector 2 is derived from conductor 3 emanating from phase coder 4. Phase detector 2 may be of a conventional type which produces an output signal on conductor 5 whose amplitude is substantially determined only by the phase difference between the signal and reference inputs and is maximum when said phase difference is 0° or 180°, and is zero when said phase difference is 90° or 270°.

The output of phase detector 2 is coupled by conductor 5 to sampling gate 6 which is rendered conductive by gating pulses as applied via conductor 8, which pulses occur in a fixed time relationship with the phase coded pulses at input 3 of phase detector 2. The gating pulses are produced by a conventional pulse generator 9 which is adapted to have a variable repetition rate. The output of generator 9 is applied to the control input of phase coder 4 and to fixed delay 10.

Fixed delays 10 and 26 provide the necessary time delay in the receiver and transmitter circuits, respectively, to allow for the phase shifting of the signal outputs from oscillators 11 and 19 in the time interval between the occurrence of the phase coded pulses.

A signal input to phase coder 4 is derived from the output of oscillator 11 which is adapted as by means of frequency control 20 to operate at substantially the same frequency as transmitter oscillator 19. The output of sampling gate 6 is applied to low-pass filter 7 which is adapted to transmit the D.C. component and to reject the A.C. component of the signals appearing at the output of sampling gate 6. The amplitude of the D.C. component may be monitored by meter 21.

FIG. 2 illustrates for the purpose of clarity a simplified embodiment of the phase coding apparatus of the present invention for use in coders 24 and 4 of FIG. 1. The signal input of phase coder 4, for example, as derived from oscillator 11, is applied to the movable arm 13 of a multiposition stepping switch 12. A three-position switch is shown by way of example, it being understood that more switch positions may be required for certain species of the present invention as will appear more fully later. Arm 13 is advanced one contact position by means of stepping relay 14 which is energized sequentially by individual pulses as produced by pulse generator 9 of FIG. 1. Each of the contacts of stepping switch 12 is connected to a respective conventional phase shifting network 15, 16, and 17. Each of said phase shifting networks is adjusted to produce a predetermined amount of phase shift in the oscillator signal applied to movable arm 13. Thus, it will be seen that phase relation between the output signal appearing on conductor 3 and the input signal applied to movable arm 13 is determined by the particular phase shift network to which movable arm 13 is connected at any given time. The apparatus of FIGS. 1 and 2 so far described corresponds to that disclosed in copending patent applications U.S. Serial Nos. 558,570 and 650,534.

The adjustment of phase shifting networks 15, 16 and 17, so as to produce respective amounts of phase shift, is predicated on a predetermined phase shift sequence in accordance with the present invention as will be described more fully later. Definite systemic advantages are obtained in the radio communication system of the present invention when the sequential amounts of phase shift are so adjusted.

In an illustrative application of the apparatus of the present invention, it may be desirable to make the output of oscillator 11 phase coherent with the output of carrier oscillator 19. As previously mentioned, the particular phase code employed at the transmitter is known in advance at the receiver so that the output of phase coder 4 of the receiver is a signal having the same phase and phase progression pattern as the transmitted signals. Thus, the transmitter and receiver both will employ equivalent phase coders.

For purposes of explanation, the phase progression pattern of the received signal as applied via conductor 1 to phase detector 2 is represented by the series $\theta_1, \theta_2, \ldots \theta_r, \ldots \theta_n$. Similarly, the phase progression pattern of the reference signal applied to conductor 3 of phase detector 2 is identified by the series $\phi_1, \phi_2, \ldots \phi_r, \ldots \phi_n$.

Despite the fact that the output signal of phase coder 4 has the same phase progression pattern as that of the phase coded transmitted signal, the problem remains to synchronize the pattern of phase coder 4 with that of transmitter phase coder 24 so that the individual phase coded signal outputs therefrom may be brought into mutual phase coherence at the respective inputs to detector 2. It will be recognized that when such phase coherence is achieved between the phase coded signals, then the aforementioned desired establishment of phase coherence between oscillators 11 and 19 is accomplished. In this case, the phase coding of the transmitted signals may be considered to be a medium for the discriminatory remote reception of information respecting the phase of the carrier signal generated by oscillator 19. Assuming that oscillator 19 is being employed as a highly accurate timing standard, it follows that the accuracy thereof may be imparted to a remotely located secondary timing standard such as oscillator 11 upon the establishment of phase coherence between oscillators 19 and 11. The attainment of phase coherence between the primary timing standard (oscillator 19) and the remotely located secondary timing standard (oscillator 11) is unambiguously evidenced by the actuation of meter 21.

The actuation of meter 21 is also indicative of coherence between oscillators 25 and 9 as well as the precise synchronization of phase coders 24 and 4. Said synchronization signifies in terms of the electromechanical coder embodiment shown in FIG. 2, that the arm 13 of the stepping switch 12 used in transmitter coder 24 is "in step" with the arm of the corresponding stepping switch used in receiver coder 4. Thus, the actuation of meter 21 indicates that the three receiver timing devices (oscillator 11, generator 9 and coder 4) are each coherently operative with a respective one of the corresponding three transmitter timing devices (oscillator 19, generator 25 and coder 24). Oscillator 11, generator 9 and coder 4 may be considered as being fine, medium and coarse time repeaters which make available at a remote receiver all the precise timing data generated within the transmitter. One of the more important features of the present invention is that no D.C. signal is produced at the output of low-pass filter 7 for the actuation of meter 21 unless the phase progression pattern of the signal as applied via conductor 3 to phase detector 2 precisely matches that of the received signal applied via conductor 1.

This desirable feature is susceptible to the following proof: Let $\theta_1$ represent the phase of the first pulse of the sequence of phase coded pulsed signals applied via conductor 1 to phase detector 2 and $\phi_1$ represent the phase of the first pulse of the sequence of phase coded signals applied via conductor 3 to phase detector 2. The phase of the general term $\theta_r$ of the received signal phase progression, relative to the phase of the first pulse having a phase of $\theta_1$ is defined by the following expression:

$$\theta_r=\frac{\pi}{n}(r-1)[p(n-1-r)-2m]+\theta_1 \qquad (1)$$

Similarly, the phase of the general term $\phi_r$ of the locally generated signal phase progression relative to the phase of the first pulse having a phase of $\phi_1$ is defined by the following expression:

$$\theta_r=\frac{\pi}{n}(r-1)[p(n-1-r)-2m]+\theta_1 \qquad (2)$$

In Expressions 1 and 2, $r$ takes on the values 2, 3, . . . $n$ and $m$ is an integer such that $0\leq m<n$. Additionally, $n$ is an integer greater than zero whose square root is irrational. The symbol $p$ represents an integer relatively prime to $n$. That is, there are no integers $a$ and $b$ both of which are less than $n$ such that $ap=bn$. If $n=6$, then $$\frac{b}{a}=\frac{p}{6}$$

Accordingly, $p$ may equal, for example, 1 or 5 but not 2, 3 or 4.

The well known operation of phase detector 2 of FIG. 1 is such as to produce an output signal proportional to a function of the applied signal and reference carrier wave amplitudes multiplied by the cosine of the phase angle between said signal and reference carrier waves. Thus, if S($t$) is the signal amplitude, R($t$) is the reference amplitude, and $\psi(t)$ is the phase angle between said signal and reference waves, the output from the phase detector is $F[S(t), R(t)]\cos\psi(t)$. Inasmuch as S and R have the same repetition rate and since the output of phase detector 2 is sampled (as by means of sampling gate 6) at that same repetition rate, then the sampled output is such that F(S, R) is constant for all samples and only varies in accordance with $\cos\psi(t)$.

It will now be shown that if all the samples are averaged over the total of $n$ pulses, over which number of pulses the phase progression pattern of the present invention is periodic, then the average output from sampling gate 6 is zero (no D.C. component) for all but one possible phase alignment of the reference and signal waves.

The average value of the samples at the output of gate 6 is proportional to the summation $$\frac{1}{n}\sum_{r=1}^{n}\cos(\theta_r-\phi_r) \qquad (3)$$

If the average over $n$ is zero and the phase progression pattern of the signals is periodic (as previously defined) over a period $n$, then the average over $2n$, $3n$, . . . will also be zero and will approach zero for any number of samples which are much greater than $n$. It should be noted that if the function $$\frac{1}{n}\sum_{r=1}^{n}\epsilon^{i(\theta_r-\phi_r)}=0 \qquad (4)$$

where $i=\sqrt{-1}$, then the individual real and imaginary component functions of equivalent expression $$\frac{1}{n}\sum_{r=1}^{n}\cos(\theta_r-\phi_r)+i\frac{1}{n}\sum_{r=1}^{n}\sin(\theta_r-\phi_r)$$ both equal zero For the reason that the exponential summation is generally more convenient to handle from a mathematical point of view than the equivalent trigonometrical summation, the exponential summation will be used for the purpose of demonstrating that the real component as described by Expression 3 of the total function of Equation 4 is equal to zero when the total function of Equation 4 is equal to zero.

Assuming that each of the pulses of the series of locally generated pulses as applied by conductor 3 to phase detector 2 is displaced from its corresponding pulse in the series of received pulses, as applied via conductor 1 to phase detector 2, the average value of the signal at the output of phase detector 2 is $$\frac{1}{n}\sum_{r=1}^{n}\epsilon^{i(\theta_r-\phi_r+q)} \qquad (5)$$

The symbol $q$ represents the number of pulse positions by which each pulse of the locally generated signal is displaced from its corresponding pulse in the received series of phase coded pulsed signals.

Substituting Expressions 1 and 2 into Expression 5 there results $$\frac{1}{n}\sum_{r=1}^{n}\epsilon^{i\left\{\frac{\pi}{n}(r-1)[p(n-1-r)-2m]+\theta_1\frac{\pi}{n}(r+q-1)[p(n-1-r-q)-2m]-\theta_1\right\}}$$

which, when simplified, $$=\frac{1}{n}\epsilon^{i\left\{\theta_1-\phi_1+\frac{\pi}{n}[2mq+q^2p-qpn]\right\}}\sum_{r=1}^{n}\epsilon^{\frac{i2\pi pqr}{n}} \qquad (6)$$

By reference to a standard Algebra text, for example, R. Brink "College Algebra," D. Appleton Century Company, New York, 1933, page 215, it can be seen that the indicated sum $$\sum_{r=1}^{n}\epsilon^{\frac{i2\pi pqr}{n}}$$

is the sum of a geometric progression whose value is $$\frac{\epsilon^{\frac{i2\pi pq}{n}}\left[1-\epsilon^{\frac{i2\pi pqn}{n}}\right]}{1-\epsilon^{\frac{i2\pi pq}{n}}} \qquad (7)$$

It will be observed that if the value of the function as represented by Expression 7 is proven to be equal to zero, then the value of Expression 6 must be equal to zero. This in turn will prove that no D.C. output is produced from filter 7 in the event that each pulse of the locally generated series of pulses is displaced from its corresponding pulse of the series of received phase coded pulse signals by an amount $q$ where $0<q<n$. The value of Expression 7 can be proven to be equal to zero if it can be shown that the numerator thereof equals zero at the same time that the denominator thereof has a value other than zero.

It was previously stated that $p$ is an integer relatively prime to $n$. In other words, $$\epsilon^{\frac{i2\pi p}{n}}$$

is a primitive $n$th root of unity, that is, there is no integer Q greater than zero and less than $n$ whereby $$\epsilon^{\frac{i2\pi pQ}{n}}$$

equals unity. Therefore, $$\epsilon^{\frac{i2\pi pQ}{n}}\neq 1$$

if $0<Q<n$. However, $Q=q$. Thus, the entire denominator of Expression 7

$$1-\epsilon^{\frac{i2\pi pq}{n}}\neq 0$$

As to the factor $$\epsilon^{\frac{i2\pi pqn}{n}}$$

in the numerator of Expression 7, inasmuch as $$\epsilon^{\frac{i2\pi p}{n}}$$

was previously defined as the primitive $n$th root of unity, it is obvious that this quantity raised to the $n$th power equals unity. Moreover, since $q$ must be an integer, it is clear that the direction of the polar vector $$\epsilon^{\frac{i2\pi pn}{n}}$$

is unaffected by rotating it through an integral number of $2\pi$ radians as is accomplished by multiplying the exponent of $\epsilon$ by $q$. Thus, $$\epsilon^{\frac{i2\pi pqn}{n}}$$

will still equal unity and the quantity $$1-\epsilon^{\frac{i2\pi pqn}{n}}$$

equals zero, causing the entire Expression 7 to be equal to zero.

In the case of sequence alignment between the pulses of the locally generated signal and those of the received signal, i.e., $q=0$ but $\theta_1 \neq \phi_1$, then by inspection of Expression 6

$$\frac{1}{n}\sum_{r=1}^{n}\epsilon^{i(\theta_r-\phi_r)}=\frac{1}{n}\epsilon^{i(\theta_1-\phi_1)}\sum_{r=1}^{n}\epsilon^{0}$$

Inasmuch as $$\sum_{r=1}^{n}\epsilon^{0}=n$$

there finally results $$\frac{1}{n}\sum_{r=1}^{n}\epsilon^{i(\theta_r-\phi_r)}=\epsilon^{i(\theta_1-\phi_1)} \tag{8}$$

In the case of complete alignment between the pulses of the locally generated signal and those of the received signal, i.e., $q=0$ and $\theta_1=\phi_1$, then by inspection of Equation 8 it can be said that $$\frac{1}{n}\sum_{r=1}^{n}\epsilon^{i(\theta_r-\phi_r)}=1$$

From the preceding mathematical proofs it can be seen that in order to produce a signal having a D.C. component at the output of low-pass filter 7, it is required that the received signal and reference signal inputs of phase detector 2, as respectively applied via conductors 1 and 3, be phase coherent. The required coherence may be obtained by first adjusting local oscillator 11 to the known frequency of transmitter oscillator 19. The repetition rate of generator 9 is then adjusted to a frequency slightly different from the known frequency of generator 25 which causes the stepping rate of coder 4 to be somewhat different from the stepping rate of coder 24. In due course, because of the different stepping rates, arm 13 of coder 4 will be brought into alignment with the corresponding arm of coder 24. This alignment will be evidenced by deflection of meter 21. As soon as deflection is observed, the repetition rate of generator 9 is adjusted to the known repetition rate of generator 25 to maintain synchronization of the coder arm. Finally, control 20 is momentarily adjusted so as to properly phase oscillator 11 to produce a maximum deflection on meter 21. At this point complete synchronization is achieved ($q=0$ and $\theta_1=\phi_1$) with the result that oscillator 11, generator 9 and coder 4 are precisely and unambiguously synchronized with oscillator 19, generator 25 and coder 24.

The objects of the present invention have been achieved by the provision of phase coding apparatus at a transmitter for generating phase coded pulsed signals and equivalent phase coding apparatus at a remote receiver capable of precisely reproducing the phase coded signals generated by the transmitter. The receiver of the present invention includes a phase detector to which are applied the locally generated phase coded signals and the received signals. The output of the receiver phase detector is applied to a low-pass filter for passing the D.C. signal component and for substantially rejecting all other components whereby a maximum D.C. output is produced from the filter only when the received phase coded signal and the locally generated phase coded signal are in precise phase alignment.

The unique output (maximum D.C.) produced by the receiver of the present invention is made possible by the adjustment of the transmitter and receiver phase coder parameters so as to produce a sequence of phase shifted signals wherein the phase $\theta_r$ of a given pulse $r$ is related to the phase $\theta_1$ of the first pulse of the sequence of phase coded pulses according to the expression $$\theta_r=\frac{\pi}{n}(r-1)[p(n-1-r)-2m]+\theta_1$$

in which $n$ is an integer whose square root is irrational, the number $n$ being the number of pulses over which the phase sequence of the phase coded pulses is periodic; $r$ is an integer greater than 1 but less than or equal to $n$; $p$ is an integer relatively prime to $n$; and $m$ is an integer equal to or greater than 0 but less than $n$.

It will be observed that the foregoing mathematical proof, showing that no D.C. signal is produced at the output of filter 7 when the corresponding pulses of the sequence of received phase coded pulses and the sequence of locally generated phase coded pulses are misaligned by a number of pulse positions $q$ where $0<q<n$, presupposes that for each received phase coded pulse there is one simultaneously occurring pulse of the sequence of locally generated phase coded pulses at phase detector 2. This condition can be fulfilled only in the event that the same uniform time separation exists between the successive signals of the received and locally generated sequence of phase coded signals.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A radio communication system including a transmitter for producing phase coded pulsed carrier transmissions and a receiver adapted to receive said transmissions, said transmitter including a first source of carrier signal, a first source of constant repetition rate pulses, a first phase coder connected to both said first sources and adapted to receive said carrier signal and said pulses to produce therefrom a first series of successive phase coded carrier signals, the phase sequence of said first series of said signals being periodic over a number of signals $n$, which number is an integer greater than zero having an irrational square root, the phase value $\theta_r$ of the carrier of the $r$th signal of said series being related to the phase value $\theta_1$ of the carrier of the first signal of said first series according to the expression $$\theta_r=\frac{\pi}{n}(r-1)[p(n-1-r)-2m]+\theta_1$$

where $1<r\leqq n$, $p$ is an integer relatively prime to $n$ and $m$ is an integer such that $0\leqq m<n$, pulse delay means coupled to the output of said first source of pulses, means coupled to said first phase coder and to said delay means for amplitude modulating the signal output of said first phase coder with the signal output of said delay means to produce said first series of phase coded pulsed carrier signals having uniform time spacing between pulses, and means connected to the modulating means for transmitting the output of said modulating means; said receiver including a second source of carrier signal, a second source of pulses, a second phase coder connected to both said second sources for producing a second series of phase coded signals having substantially the same phase characteristics as those of said first series, a phase detector having first and second inputs, means for receiving said transmissions, means for applying the received transmissions to said first input, means for applying said second series of signals to said second input, signal utilization means, and a low-pass filter connected between said phase detector and said utilization means for coupling the output of said phase detector to said utilization means.

2. A radio communication system including a transmitter for producing phase coded pulsed carrier transmissions and a receiver adapted to receive said transmissions, said transmitter including a first source of carrier signal, a first source of pulses, a first phase coder connected to both said first sources and adapted to receive said carrier signal and said pulses to produce therefrom a first series of uniformly time spaced phase coded carrier signals, the phase sequence of said first series of said signals being periodic over a number of signals $n$, which number is an integer greater than zero having an irrational square root, the phase value $\theta_r$ of the carrier of the $r$th signal of said first series being related to the phase value $\theta_1$ of the carrier of the first signal of said first series according to the expression $$\theta_r=\frac{\pi}{n}(r-1)[p(n-1-r)-2m]+\theta_1$$

where $1<r\leq n$, $p$ is an integer relatively prime to $n$ and $m$ is an integer such that $0\leq m<n$, and means connected to said first phase coder for transmitting the output of said first phase coder; said receiver including a second series of carrier signal, a second source of pulses, a second phase coder connected to both said second sources for producing a second series of uniformly time spaced phase coded signals having substantially the same phase characteristics as those of said first series, a phase detector having first and second inputs, means for receiving said transmissions, means for applying the received transmissions to said first input, means for applying said second series of signals to said second input, signal utilization means, and a low-pass filter connected between said phase detector and said utilization means for coupling the output of said first detector to said utilization means.

3. A radio communication system including a transmitter for producing phase coded pulsed carrier transmissions and a receiver adapted to receive said transmissions, said transmitter including a first source of carrier signal, a first source of fixed repetition rate pulses, a first phase coder connected to both said first sources and adapted to receive said carrier signal and said pulses to produce therefrom a first series of successive phase coded carrier signals, the phase sequence of said first series of said first signals being periodic over a number of signals $n$, which number is an integer greater than zero having an irrational square root, the phase value $\theta_r$ of the carrier of the $r$th signal of said first series being related to the phase value $\theta_1$ of the carrier of the first signal of said first series according to the expression $$\theta_r=\frac{\pi}{n}(r-1)[p(n-1-r)-2m]+\theta_1$$

where $1<r\leq n$, $p$ is an integer relatively prime to $n$ and $m$ is an integer such that $0\leq m<n$, pulse delay means coupled to the output of said first source of pulses, means connected to said first phase coder and to said pulse delay means for modulating the signal output of said first phase coder with the signal output of said pulse delay means to produce said first series of phase coded pulsed carrier signals having uniform time spacing between pulses, and means connected to the modulating means for transmitting the output of said modulating means; said receiver including means for receiving said transmissions, demodulating means having substantially the same phase response characteristics as the phase characteristics of said first series of carrier signals for cross-correlating the phase characteristics of the received transmissions with said response characteristics, means connected between said means for receiving and said demodulating means for coupling the output of said means for receiving to the input of said demodulating means, signal utilization means, and a low-pass filter connected between said demodulating means and said utilization means for coupling the output of said demodulating means to said utilization means.

4. A radio communication system including a transmitter for producing phase coded pulsed carrier transmissions and a receiver adapted to receive said transmissions, said transmitter including a first source of carrier signal, a first source of pulses, a first phase coder connected to both said first sources and adapted to receive said carrier signal and said pulses to produce therefrom a first series of uniformly time spaced phase coded carrier signals, the phase sequence of said first series of said signals being periodic over a number of signals $n$, which number is an integer greater than zero having an irrational square root, the phase value $\theta_r$ of the carrier of the $r$th signal of said first series being related to the phase value $\theta_1$ of the carrier of the first signal of said first series according to the expression $$\theta_r=\frac{\pi}{n}(r-1)[p(n-1-r)-2m]+\theta_1$$

where $1<r\leq n$, $p$ is an integer relatively prime to $n$ and $m$ is an integer such that $0\leq m<n$, and means connected to said first phase coder for transmitting the output of said first phase coder; said receiver including means for receiving said transmissions, demodulating means having substantially the same phase response characteristics as the phase characteristics of said first series of carrier signals for cross-correlating the phase characteristics of the received transmissions with said response characteristics, means connected between said means for receiving and said demodulating means for coupling the output of said means for receiving to the input of said demodulating means, signal utilization means, and a low-pass filter connected between said demodulating means and said utilization means for coupling the output of said demodulating means to said utilization means.

5. In a signal communication system, a transmitter comprising a source of carrier signal, a source of uniformly timed-spaced pulses, a phase coder connected to both said sources and adapted to receive said carrier signal and said pulses to produce therefrom a series of successive phase coded carrier signals, the phase sequence of said series of said signals being periodic over a number of signals $n$, which number is an integer greater than zero having an irrational square root, the phase value $\theta_r$ of the carrier of the $r$th signal of said series being related to the phase value $\theta_1$ of the carrier of the first signal of said series according to the expression $$\theta_r=\frac{\pi}{n}(r-1)[p(n-1-r)-2m]+\theta_1$$

where $1<r\leq n$, $p$ is an integer relatively prime to $n$ and $m$ is an integer such that $0\leq m<n$, pulse delay means coupled to the output of said source of pulses, means connected to said phase coder and to said pulse delay means for amplitude modulating the signal output of said phase coder with the signal output of said pulse delay means to produce said series of phase coded pulsed carrier signals having uniform time spacing between pulses, and means connected to said modulating means for transmitting the output of said modulating means.

6. In a signal communication system, a transmitter comprising a source of carrier signal, a source of pulses, a phase coder connected to both said sources and adapted to receive said carrier signal and said pulses to produce therefrom a series of uniformly time spaced phase coded carrier signals, the phase sequence of said series of said signals being periodic over a number of signals $n$, which number is an integer greater than zero having an irrational square root, the phase value $\theta_r$ of the carrier of the $r$th signal of said series being related to the phase value $\theta_1$ of the carrier of the first signal of said series according to the expression $$\theta_r=\frac{\pi}{n}(r-1)[p(n-1-r)-2m]+\theta_1$$

where $1<r\leq n$, $p$ is an integer relatively prime to $n$ and $m$ is an integer such that $0\leq m<n$, and means connected to said phase coder for transmitting the output of said phase coder.

7. A receiver for use in a radio communication system utilizing uniformly time spaced phase coded pulsed carrier transmissions, said receiver comprising a source of local carrier signal having substantially the same frequency as that of the carrier of said transmissions, a source of local pulses having substantially the same repetition rate as that of the pulses of said transmissions, a phase coder connected to both said sources and adapted to receive said local carrier signal and said local pulses to produce therefrom a series of successive phase coded carrier signals having substantially the same phase characteristics as that of said phase coded pulsed carrier transmissions, the phase sequence of said series of said signals being periodic over a number of signals $n$, which number is an integer greater than zero having an irrational square root, the phase value $\theta_r$ of the carrier of the $r$th signal of said series being related to the phase value $\theta_1$ of the carrier of the first signal of said series according to the expression $$\theta_r=\frac{\pi}{n}(r-1)[p(n-1-r)-2m]+\theta_1$$

where $1<r\leq n$, $p$ is an integer relatively prime to $n$ and $m$ is an integer such that $0\leq m<n$, means for receiving said pulsed carrier transmissions, a phase detector having first and second inputs, means connected to said phase coder and to said phase detector for coupling the output of said phase coder to said first input, means connected to said means for receiving and to said phase detector for coupling the output of said means for receiving to said second input, signal utilization means, and a low-pass filter connected between said phase detector and said utilization means for coupling the output of said phase detector to said utilization means.

8. A receiver for use in a radio communication system utilizing uniformly time spaced phase coded pulsed carrier transmissions, said receiver comprising a source of local carrier signal having substantially the same frequency as that of the carrier of said transmissions, a source of local pulses having substantially the same repetition rate as that of the pulses of said transmissions, a phase coder connected to both said sources and adapted to receive said local carrier signal and said local pulses to produce therefrom a series of successive phase coded carrier signals having substantially the same phase characteristics as that of said phase coded pulsed carrier transmissions, the phase sequence of said series of said signals being periodic over a number of signals $n$, which number is an integer greater than zero having an irrational square root, the phase value $\theta_r$ of the carrier of the $r$th signal of said series being related to the phase value $\theta_1$ of the carrier of the first signal of said series according to the expression $$\theta_r=\frac{\pi}{n}(r-1)[p(n-1-r)-2m]+\theta_1$$

where $1<r\leq n$, $p$ is an integer relatively prime to $n$ and $m$ is an integer such that $0\leq m<n$, means for receiving said pulsed carrier transmissions, a phase detector having first and second inputs, means connected to said phase coder and to said phase detector for coupling the output of said phase coder to said first input, means connected to said means for receiving and to said phase detector for coupling the output of said means for receiving to said second input, pulse delay means connected to the output of said source of local pulses, pulse sampling means coupled to the output of said phase detector and to said pulse delay means and adapted to be rendered conductive by the pulsed output of said pulse delay means, signal utilization means, and a low-pass filter connected between said sampling means and said utilization means for coupling the output of said sampling means to said utilization means.

9. In a radio communication system utilizing uniformly time spaced phase coded pulsed carrier transmissions, said transmissions being comprised of a series of successive phase coded carrier signals, the phase sequence of said series of signals being periodic over a number of signals $n$, which number is an integer greater than zero having an irrational square root, the phase value $\theta_r$ of the carrier of the $r$th signal of said series being related to the phase value $\theta_1$ of the carrier of the first signal of said series according to the expression $$\theta_r=\frac{\pi}{n}(r-1)[p(n-1-r)-2m]+\theta_1$$

where $1<r\leq n$, $p$ is an integer relatively prime to $n$ and $m$ is an integer such that $0\leq m<n$, a receiver comprising means for receiving said phase coded pulsed transmissions, demodulating means having substantially the same phase response characteristics as the phase characteristics of said first series of carrier signals for cross-correlating the phase characteristics of the received phase coded signals with said response characteristics, means connected to said means for receiving and to said demodulating means for coupling the output of said means for receiving to the input of said demodulating means, signal utilization means, and a low-pass filter connected between said demodulating means and said utilization means for coupling the output of said demodulating means to said utilization means.

10. In a signal communication system, a transmitter comprising a source of carrier signal, a source of pulses, a phase coder connected to both said sources and adapted to receive said carrier signal and said pulses to produce therefrom a series of successive phase coded carrier signals, the phase sequence of said series of said signals being periodic over a number of signals $n$, which number is an integer greater than zero having an irrational square root, the phase value $\theta_r$ of the carrier of the $r$th signal of said series being related to the phase value $\theta_1$ of the carrier of the first signal of said series according to the expression $$\theta_r=\frac{\pi}{n}(r-1)[p(n-1-r)-2m]+\theta_1$$

where $1<r\leq n$, $p$ is an integer relatively prime to $n$ and $m$ is an integer such that $0\leq m<n$, pulse delay means coupled to the output of said source of pulses, and means connected to said phase coder and to said pulse delay means for amplitude modulating the signal output of said phase coder with the signal output of said pulse delay means.

11. Means for generating phase coded carrier signals comprising a source of carrier signal, a source of uniformly time spaced pulses, and a phase coder connected to both said sources and adapted to receive said carrier signal and said pulses to produce therefrom a series of uniformly time spaced phase coded carrier signals, the phase sequence of said series of said signals being periodic over a number of signals $n$, which number is an integer greater than zero having an irrational square root, the value $\theta_r$ of the carrier of the $r$th signal of said series being related to the phase value $\theta_1$ of the carrier of the first signal of said series according to the expression $$\theta_r=\frac{\pi}{n}(r-1)[p(n-1-r)-2m]+\theta_1$$

where $1<r\leq n$, $p$ is an integer relatively prime to $n$ and $m$ is an inetger such that $0\leq m<n$.

12. A detector adapted to receive uniformly time spaced phase coded pulsed carrier signals and operative to produce a D.C. output in response thereto, said phase coded signals being comprised of a first series of uniformly time spaced phase coded carrier signals, the phase sequence of said first series of said signals being periodic over a number of signals $n$, which number is an integer greater than zero having an irrational square root, the phase value $\theta_r$ of the carrier of the $r$th signal of said first series being related to the phase value $\theta_1$ of the carrier of the first signal of said first series according to the expression $$\theta_r=\frac{\pi}{n}(r-1)[p(n-1-r)-2m]+\theta_1$$

where $1<r\leqq n$, $p$ is an integer relatively prime to $n$ and $m$ is an integer such that $0\leqq m<n$; said detector comprising a source of local carrier signal, a source of local pulses, a phase coder connected to both said sources and adapted to receive said local carrier signal and said local pulses for producing a second series of phase coded carrier signals having substantially the same phase characteristics as those of said first series, a phase detector having first and second inputs, means for applying said first series of phase coded pulsed carrier signals to said first input, means connected to said phase coder and to said phase detector for applying said second series of signals to said second input, and a low-pass filter connected to the output of said phase detector.

13. A detector adapted to receive uniformly time spaced phase coded pulsed carrier signals and operative to produce a D.C. output in response thereto, said phase coded signals being comprised of a first series of uniformly time spaced phase coded carrier signals, the phase sequence of said first series of said signals being periodic over a number of signals $n$, which number is an integer greater than zero having an irrational square root, the phase value $\theta_r$ of the carrier of the $r$th signal of said first series being related to the phase value $\theta_1$ of the carrier of the first signal of said first series according to the expression $$\theta_r=\frac{\pi}{n}(r-1)[p(n-1-r)-2m]+\theta_1$$

where $1<r\leqq n$, $p$ is an integer relatively prime to $n$ and $m$ is an integer such that $0\leqq m<n$; said detector comprising a source of local carrier signal, a source of local pulses, and a phase coder connected to both said sources and adapted to receive said local carrier signal and said local pulses for producing a second series of phase coded carrier signals having substantially the same phase characteristics as those of said first series, a phase detector having first and second inputs, means for applying said first series of phase coded pulsed carrier signals to said first input, means connected to said phase coder and to said phase detector for applying said second series of signals to said second input, pulse delay means connected to the output of said source of local pulses, pulse sampling means coupled to the output of said phase detector and to said pulse delay means and adapted to be rendered conductive by the pulsed output of said pulse delay means, and a low-pass filter connected to the output of said sampling means.

References Cited in the file of this patent

UNITED STATES PATENTS

| | | |
|---|---|---|
| 1,464,096 | Hartley | Aug. 6, 1923 |
| 2,129,860 | Mitchell | Sept. 13, 1938 |
| 2,768,372 | Green | Oct. 23, 1956 |

FOREIGN PATENTS

| | | |
|---|---|---|
| 724,555 | Great Britain | Feb. 23, 1955 |